(12) United States Patent
Calman (10) Patent No.: US 9,336,548 B2
(45) Date of Patent: May 10, 2016

(54) WISH LIST PRODUCT AVAILABILITY NOTIFICATION FOR A SOCIAL NETWORK-BASED WISH LIST

(71) Applicant: Bank of America Corporation, Charlotte, NC (US)

(72) Inventor: Matthew A. Calman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 559 days.

(21) Appl. No.: 13/780,670

(22) Filed: Feb. 28, 2013

(65) Prior Publication Data

US 2014/0244369 A1     Aug. 28, 2014

(51) Int. Cl.
*G06Q 30/06*     (2012.01)
*G06Q 50/00*     (2012.01)
*G06Q 30/08*     (2012.01)

(52) U.S. Cl.
CPC ............ *G06Q 30/0633* (2013.01); *G06Q 50/01* (2013.01)

(58) Field of Classification Search
CPC ............................... G06Q 30/06; G06Q 30/08
USPC ................................................ 705/26.1, 27.1
See application file for complete search history.

(56) References Cited

U.S. PATENT DOCUMENTS

| | | |
|---|---|---|
| 7,136,829 B2 | 11/2006 | Hellal et al. |
| 7,925,542 B2 | 4/2011 | Shah |
| 7,970,661 B1 * | 6/2011 | Abraham ............... G06Q 10/10 705/14.23 |
| 7,992,203 B2 | 8/2011 | Relyea |
| 7,996,270 B2 | 8/2011 | Sundaresan |
| 8,065,190 B2 | 11/2011 | Collas et al. |
| 8,135,629 B2 | 3/2012 | Fuzell-Casey et al. |
| 8,185,434 B2 | 5/2012 | Bous |
| 8,214,335 B2 | 7/2012 | Hamilton, II et al. |
| 2011/0178889 A1 | 7/2011 | Abraham et al. |
| 2012/0143720 A1 | 6/2012 | Moser |

OTHER PUBLICATIONS

Anonymous, PR Newswire, Sarantel Consumer Survey Reveals Major Opportunities to Commercialise Location Based Services, [New York] Jun. 17, 2009, downloaded from ProQuestDirect on the Internet on Mar. 5, 2016, 4 pages.*

(Continued)

*Primary Examiner* — James Zurita
(74) *Attorney, Agent, or Firm* — Michael A. Springs; Moore & Van Allen PLLC; James C. Edwards (57) ABSTRACT

Systems, methods, and computer program products provide for generating a social network-based wish list of products desired by members of the social network and which are authorized to be purchased by other members of the social network on behalf of the member requesting the product. The present invention provides for automatically notifying a member of the social network that they are currently located at physical location, such as a retail store or the like, that currently has available one or more of the products on the wish list. The notifications may take the form of alerts communicated on the member's mobile communication device. Automatic notification occurs via a mobile communication device that is capable of identifying current location, determining that the current location has products available, and determine that one or more of the products currently available at the location are currently listed on the wish list.

24 Claims, 4 Drawing Sheets

(56) References Cited

OTHER PUBLICATIONS

GooglePlay.com. "*Our Groceries Shopping List—Android apps on Google Play.*" https://play.google.com/store/apps/details?id=com.headcode.ourgroceries&hl=en. © 2012 Google. 2 pages. Retrieved Mar. 21, 2013.

Shanklin, Will. "*How to create a shared shopping list using Siri.*" Published Sep. 20, 2012. Gizmag.com. http://www.gizmag.com/create-shared-shopping-list-using-siri/24226/. © Gizmag 2003-2013. 4 pages. Retrieved Mar. 21, 2013.

Cozi.com. "*Free Online Shopping List and Shared Grocery List—Get organized | Cozi.*" http://www.cozi.com/shopping-list.htm. © 2006-2013 Cozi Inc. 2 pages. Retrieved Mar. 21, 2013.

Shared Shopping List.com. "*Shared Shopping List—An App for Windows Phone 7.*" http://www.sharedshoppinglist.com/. 2 pages. Retrieved Mar. 21, 2013.

ZipList.com. "*Share With Family: Let family and friends help with the grocery shopping.*" http://get.ziplist.com/how-it-works/share-with-family-friends/. © Copyright 2007-2012 ZipList, Inc. 3 pages. Retrieved Mar. 21, 2013.

\* cited by examiner

WISH LIST PRODUCT AVAILABILITY NOTIFICATION FOR A SOCIAL NETWORK-BASED WISH LIST

FIELD OF THE INVENTION

In general, embodiments herein disclosed relate to commerce and, more specifically notifying a member of a social network that a product currently listed on a social network-based wish list is currently available at the location where the member currently resides.

BACKGROUND

While the Internet has made it easier for shoppers to locate products and locate products at a price which the shopper is willing to pay for the product, in many other instances the Internet may not always be the optimal means for locating a product or finding a product at a desired price. For example, some products may not be readily offered via the Internet, such as regionally offered products, custom products or the like, while in other instances the shear physical size of the product and the shipping costs associated with the product may not make the Internet the best cost-alternative for purchasing the product.

In those instances in which someone desiring a product (or a product at a specific price point) resorts to locating the product at a physical location, such as a retail store or the like, it can be a daunting task if the product is not in wide distribution or is not typically found at the price at which the shopper is willing to pay. The shopper may spend an unreasonable amount of time and effort in an attempt to locate the product or find the product at the price they desire to pay for the product. In some instances such attempts at finding the product or the product at the desired price may prove futile, since the shopper is typically limited to the geographic region of residence or work.

Therefore, a need exists to assist shoppers (i.e., users) in locating and purchasing products that are not readily available or not readily available at a price which the shopper is willing to pay. The desired system should eliminate or limit the effort that the shopper must put forth to locate the product or locate the product at the price at which they are willing to pay.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.\

Methods, apparatus systems and computer program products are described herein that provide for generating a social network-based wish list of products desired by members of the social network and which are authorized to be purchased by other members of the social network on behalf of the member requesting the product. Once generated, the wish list is stored in computing device memory that is accessible and updateable to all members of the social network. In addition, to listing products which the members desire, the members may also specify within the wish list a maximum price for which they are willing to pay for an item. In specific embodiments the social network may be an exclusive social network that is limited to specific users, such as a family-based social network, a business-based social network or the like, while in other embodiments of the invention the social network may be all-inclusive social network consisting of any users who desire to participate in the social network.

The present invention provides for automatically notifying a member of the social network that they are currently located at physical location, such as a retail store or the like, that currently has available one or more of the products on the wish list. The notifications may take the form of alerts communicated on the member's mobile communication device, such as a cellular smartphone or the like. Automatic notification occurs via a mobile communication device that is capable of identifying current location, determining that the current location has products available (i.e., is a retail location), and determine that one or more of the products currently available at the location are currently listed on the wish list. Once the member has been notified of the product availability, the member of the social network may choose to purchase the product on behalf of the member requesting the product or notify the member requesting the product of its availability.

An apparatus for notifying members of a social network of the availability of products currently included on a social network-based wish list defines first embodiments of the invention. The apparatus includes a computing platform comprising a processor and a memory in communication with the processor. The apparatus further includes a wish list module stored in the memory, executable by the processor, configured to store the social network-based wish list that includes products desired by one or more of a plurality of members of a social network, the wish list module includes a wish list product availability notification application configured to (1) determine that a first member of the social network is currently at a physical location that offers one or more of the products currently included on the wish list, and (2) in response to the determination, generate and initiate communication of an alert, to the first member of the social network, that notifies the first member that they are currently at a location that offers one or more of the products currently included on the wish list.

In specific embodiments of the apparatus, the wish list product availability notification application is further configured to (1) determine that the first member is located at physical location that offers products, (2) compare products currently listed on the wish list to products currently available at the physical location, and (3) based on the comparing, determine that a product match exists between a product currently listed on the wish list and a product currently available at the physical location.

In further specific embodiments of the apparatus, the wish list product availability notification application is further configured to store the social network-based wish list that includes products desired by one or more of a plurality of members of a social network and a maximum purchase price that each of the one or more members is willing to pay for the corresponding product. In such embodiments of the apparatus, the wish list product availability notification application may be further configured to (1) determine that the first member is located at physical location that offers products, (2) compare products currently listed on the wish list to products currently available at the physical location, and (3) based on the comparing, determining, by the computing device processor, that a product currently listed on the wish list is currently available at the physical location at a price at or below the maximum purchase price that a member is willing to pay for the product.

In still further embodiments of the apparatus, the wish list module is further configured to generate and initiate electronic communication of a notification to a second member of the social network that desired the product that indicates that product has been located. In such embodiments of the apparatus, the wish list module may be further configured to generate and initiate electronic communication of the notification including a payment link configured to allow the second member to purchase the product.

Moreover, in additional embodiments of the apparatus, the wish list module is further configured to generate and initiate electronic communication of a notification to a second member of the social network that indicates that the product has been purchased and requesting reimbursement through one of Person-to-Person (P2P) payment or online payment.

In additional specific embodiments of the apparatus, the wish list module is further configured to provide the first member of the social network a financial reward in response to the first member purchasing the product for a second member of the social network. In such embodiments of the apparatus, the wish list module may be further configured to provide the first member of the social network the financial reward, wherein the financial rewards is a difference in amount between the purchase price of the product and a maximum purchase price that a second member of the social network is willing to pay for the product.

A method for notifying members of a social network of the availability of products currently included on a social network-based wish list defines second embodiments of the invention. The method includes generating and storing, in computing device memory, the social network-based wish list that includes products desired by one or more of a plurality of members of a social network. The method further includes determining, by a computing device processor, that a first member of the social network is currently at a physical location that offers one or more of the products currently included on the wish list. Additionally the method includes, in response to the determination, generating, by a computing device processor, and initiating electronic communication, to the first member of the social network, an alert that notifies the first member that they are currently at a location that offers one or more of the products currently included on the wish list.

In specific embodiments of the method, generating and storing further includes generating and storing, in computing device memory, a social network-based wish list that includes products desired by one or more of a plurality of members of a social network and a maximum purchase price that each of the one or more members is willing to pay for the corresponding product. In such embodiments of the method, determining further includes (1) determining, by the computing device processor, that the first member is located at physical location that offers products, (2) comparing, by the computing device processor, products currently listed on the wish list to products currently available at the physical location, and (3) based on the comparing, determining, by the computing device processor, that a product currently listed on the wish list is currently available at the physical location at a price at or below the maximum purchase price that a member is willing to pay for the product.

In specific embodiments of the method, determining further includes (1) determining, by the computing device processor, that the first member is located at physical location that offers products, (2) comparing, by the computing device processor, products currently listed on the wish list to products currently available at the physical location, and (3) based on the comparing, determining, by the computing device processor, that a product match exists between a product currently listed on the wish list and a product currently available at the physical location.

In additional embodiments the method includes generating, by a computing device processor, and initiating electronic communication of a notification to a second member of the social network that desired the product that indicates that product has been located. In such embodiments, generating and initiating electronic communication of the notification may further include generating and initiating electronic communication of the notification including a payment link configured to allow the member that desires the product to purchase the product.

In still further specific embodiments the method includes generating, by a computing device processor, and initiating electronic communication of a notification to a second member of the social network that indicates that the product has been purchased and requesting reimbursement through one of Person-to-Person (P2P) payment or online payment.

In still further specific embodiments the method includes providing the first member of the social network a financial reward in response to the first member purchasing the product for a second member of the social network. In such embodiments of the method, providing may further include providing the first member of the social network the financial reward, wherein the financial rewards is a difference in amount between the purchase price of the product and a maximum purchase price that a second member of the social network is willing to pay for the product.

A computer program product including a non-transitory computer-readable medium defines third embodiments of the invention. The Computer program product includes computer-executable instructions configured to cause a computer to implement the steps. The steps include generating and storing the social network-based wish list that includes products desired by one or more of a plurality of members of a social network. The steps further include determining that a first member of the social network is currently at a physical location that offers one or more of the products currently included on the wish list. In addition, the steps include, in response to the determination, generating and initiating electronic communication, to the first member of the social network, an alert that notifies the first member that they are currently at a location that offers one or more of the products currently included on the wish list.

Thus, as described in more detail below the present invention provides for generating a social network-based wish list of products desired by members of the social network and which are authorized to be purchased by other members of the social network on behalf of the member requesting the product. Once generated, the wish list is stored in computing device memory that is accessible and updateable to all members of the social network. Further, the present invention provides for automatically notifying a member of the social network that they are currently located at physical location, such as a retail store or the like, that currently has available one or more of the products on the wish list. The notifications may take the form of alerts communicated on the member's mobile communication device, such as a cellular smartphone or the like. Automatic notification occurs via a mobile communication device that is capable of identifying current location, determining that the current location has products available (i.e., is a retail location), and determine that one or more of the products currently available at the location are currently listed on the wish list. Once the member has been notified of the product availability, the member of the social network may choose to purchase the product on behalf of the member requesting the product or notify the member requesting the product of its availability.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for provide for generating a social network-based wish list of products desired by members of the social network and which are authorized to be purchased by other members of the social network on behalf of the member requesting the product. Once generated, the wish list is stored in computing device memory that is accessible and updateable to all members of the social network. In addition, to listing products which the members desire, the members may also specify within the wish list a maximum price for which they are willing to pay for an item.

The present invention provides for automatically notifying a member of the social network that they are currently located at physical location, such as a retail store or the like, that currently has available one or more of the products on the wish list. The notifications may take the form of alerts communicated on the member's mobile communication device, such as a cellular smartphone or the like. Automatic notification occurs via a mobile communication device that is capable of identifying current location, determining that the current location has products available (i.e., is a retail location), and determine that one or more of the products currently available at the location are currently listed on the wish list. Once the member has been notified of the product availability, the member of the social network may choose to purchase the product on behalf of the member requesting the product or notify the member requesting the product of its availability.

Figure 1:
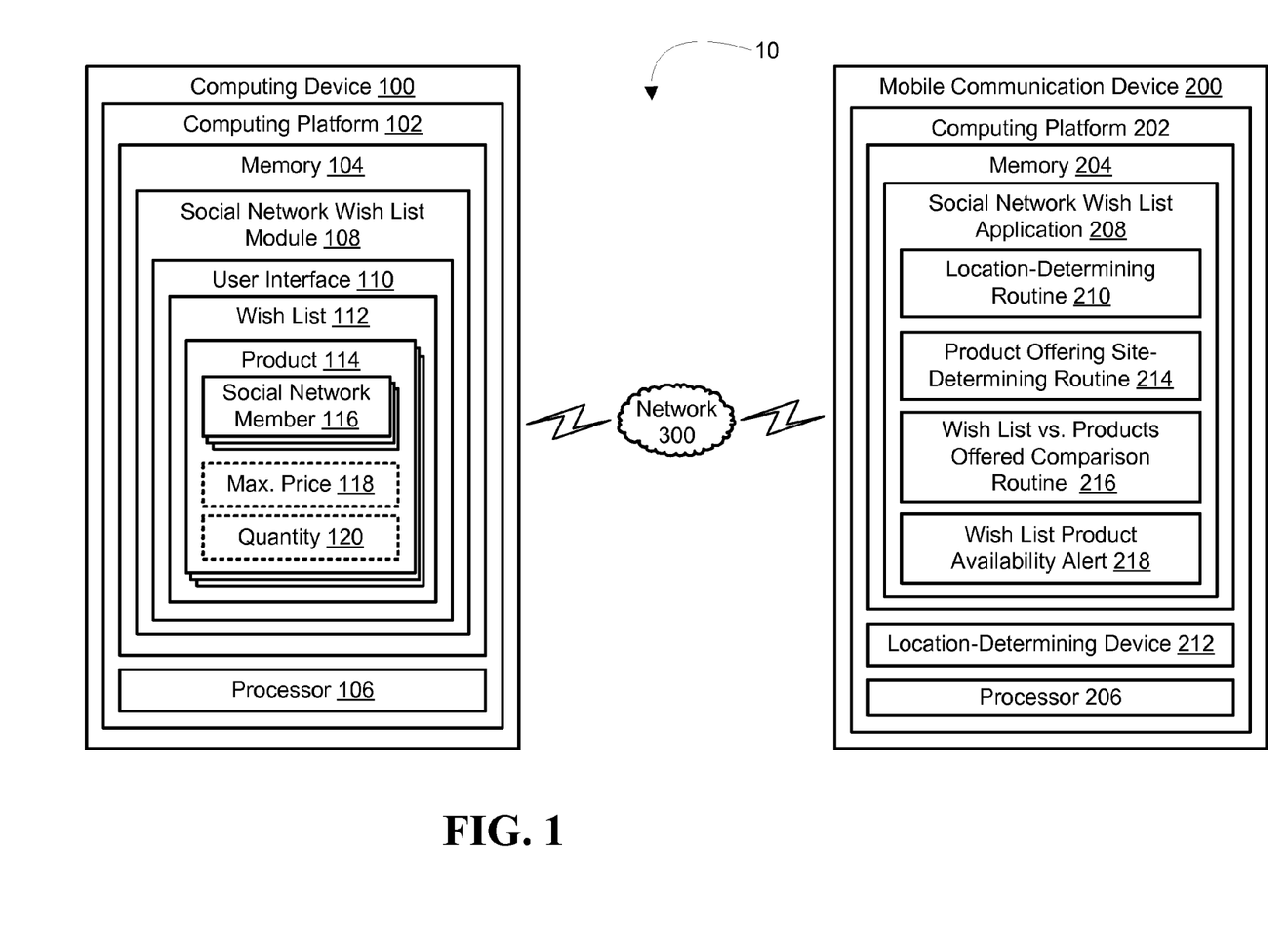
FIG. 1 is a block diagram illustrating a system for notifying members of a social network that they are currently located at a location that has available products currently listed on social network-based wish list, in accordance with an embodiment of the invention.

Referring to FIG. 1 a block diagram is presented of a system 10 for notifying members of a social network that they are currently located at a location that has available products currently listed on social network-based wish list, in accordance with embodiments of the present invention. The system 10 includes a computing device 100 having a computing platform 102, which includes a memory 104 and at least one processor 106 in communication with the memory. The computing device 100 will typically be a server device or the like that provides users (referred to herein as "members of the social network") the ability to access social network wish list module 108 and wish list 112 stored therein through a communication network 300, such as the Internet, an intranet or the like.

The social network wish list module 108 is configured to allow members of the social network the ability, through access of user interface 110 (e.g., graphical user interface application or the like), to generate and modify a wish list 112 that includes products 114 that the members desire to purchase. As previously noted, the social network may comprise an exclusive group of members, such as being limited to family members, employees of a business, members of an organization or the like. In such instances authorization credentials may be required to access the social network wish list module 108 in order to view and modify the wish list 112. In other instances the social network may comprise a more inclusive group of members based on the users/members desire to join the social network and participate in the wish list 112. In such instances, in which the social network is comprised of a more general population, a participation fee may be charged to members joining the social network by an entity implementing the social network-based wish list 112.

The wish list 112 includes products 114 that are desired by one or more social network members 116. Inclusion of a product 114 on the wish list 110 by a social network member indicates that the member desiring the product either desires another member to purchase the product when they encounter the product (without notifying the member desiring the product prior to purchasing the product), or desires to be notified by another member who is currently at a location that has the product available (thus, making it possible for the member to decide if they desire for the other member to purchase the product on their behalf). In specific embodiments products may be identified by a designated product identifier, such as a Universal Product Code (UPC) or the like to insure that the desired product (make/brand, model, size, color and the like) is the product added to the wish list. The wish list may be configured to provide for the desiring member to include other product identifying data, such as attachment of a media file, e.g., an image or video file to the wish list to insure proper identification of the desired product.

In optional embodiments of the invention the entries on the wish list 112 may also include a corresponding maximum purchase price 118 and/or quantity 120. The maximum purchase price 118 is the highest price that the member desiring the product is willing to pay for the product (i.e., the highest price that the member is willing to reimburse another member of the social network who purchases the product on their behalf). In certain instances, the maximum product price may include any taxes and/or shipping charges associated with shipping the product incurred by the retailer or the member purchasing the product on behalf the member desiring the product. While in other instances, the module may allow the member to configure the maximum price 118 such that the price reflects the product alone (i.e., not including shipping charges and/or taxes). In such instances, the member desiring the product will additionally be responsible for paying or reimbursing the member purchasing the product on their behalf for the shipping charges and/or taxes. The quantity 120 indicates the maximum number of this specific product that the member desires. In the event that another member locates and purchases less than the quantity 120 indicated, the wish list may be automatically or manually updated to reflect an updated quantity 120 desired by the member.

The system 10 additionally includes mobile communication device 200 that is in the possession of a member of the social network. The mobile communication device will typically be a smart cellular telephone, however, in other embodiments the mobile communication device may be a personal digital assistant (PDA), a mobile Internet accessing device, a laptop/portable computer, or other mobile device capable of executing applications and communication via a wireless network 300, which may be a cellular network, and/or the Internet or the like.

The mobile communication device 200 includes a computing platform 202 having a memory 204 and at least one processor 206 in communication with the memory 204. The memory 104 stores social network wish list application 208 which is configured to automatically notify the members of a social network in possession of the mobile communication device 200 that they are currently located at a location that has available products currently listed on social network-based wish list. The automatic nature of the notification (i.e., absent user/member involvement/input) provided by the social network wish list application 208 provides for the application 208 to be continuously executed in the background. The continuous execution may provide for the application 208 to run in a "sleep mode" until the application recognizes that the mobile communication device 200 is located at a location that offers products or another triggering event occurs (e.g., the mobile communication device is more than a predefined distance from the member's residence or place of work, or a motion-sensing detector in the mobile communication device indicates that the device is or has just been in motion).

Thus, social network wish list application 208 includes location-determining routine 210 that is configured to determine the current location of the mobile communication device 200. As shown, the location-determining routine 210 is included within the social network wish list application 208, however, it should be readily apparent to those of skill in the art to realize that the location-determining routine 210 may exist as a separate application running on the mobile communication device 200 that supports other applications executed on the device that require or otherwise benefit from location information. The location-determining routine 110 is in communication with location-determining device/mechanism 212, such as a Global Positioning System (GPS) device, cellular network device or the like which is operable to provide the location-determining routine 110 with the current location of the mobile communication device.

The social network wish list application 208 additionally includes (or is in communication with) product offering site-determining routine 214 that is configured to determine that the current location of the mobile communication 200 is a location that offers products (i.e., the current location is a retail store location or the like). Such a determination is made by comparing the current location of the mobile communication device 200 to a geographic mapping of retail locations.

Such a determination may require the product site-determining routine to wirelessly communicate the current location to a network entity that stores the mapping of the retail locations and, in response, wirelessly receive an indication that the mobile communication device 200 is currently located at a location that offers products. As previously noted, determination that the mobile communication device 200 is located at a location offering products may prompt the social network wish list application 208 to awaken from a sleep mode (i.e., limited execution mode) for further requisite processing.

The social network wish list application 208 additionally includes wish list versus products offered comparison routine 216 that is configured to compare the products offered at the current location to products currently listed on the wish list 110. In order for the routine 216 to make such a determination the retail store or the like at which the mobile communication device 200 is located provides network accessibility to a listing of the products that the retail store currently has available. Thus, the wish list versus products offered comparison routine 216 is in network 300 communication with the listing of the products that the retail store currently has available and the current wish in order to perform a network-based comparison of the products currently offered versus the products on the wish list. In specific embodiments of the invention, the comparison will additionally entail comparison of the current price of the product versus the maximum purchase price indicated on the wish list and/or comparison of the current available quantity of the product versus the desired quantity indicated on the wish list.

Based on the wish list versus products offered comparison routine 216 determining that a product currently available at the location of the mobile communication device is currently listed on the wish list, the application 208 will generate and initiate communication of a wish list product availability alert 218. The alert 218, which may be displayed on the mobile communication device and include an audible indicator (as configured by the mobile communication device 200 user), indicates that a product on the wish list is currently available at the current location of the mobile communication device 200. The alert 218 may include additional information, such as the current price of the product, the maximum price desired by the member desiring the product, the quantity of the product available, the quantity of the product desired by the member requesting the product, personal information associated the member desiring the product, such as delivery and or payment information, and/or delivery options provided by the retail location. In addition, the alert may indicate whether the product can be purchased without first notifying the member desiring the product, or if the member desiring product needs to be notified and confirmation of purchase received from the member prior to purchasing the product on behalf of the member. Additionally, the alert may be configured to include a link for purchasing the product or a link for generating an automated communication, such as an email or text communication, to the member desiring the product indicating the availability or the purchase of the product. Thus, in response to the alert the member of the social network (i.e., the mobile communication device user) may choose to purchase the product for the member requesting the product or choose to notify the member of the product's availability.

Figure 2:
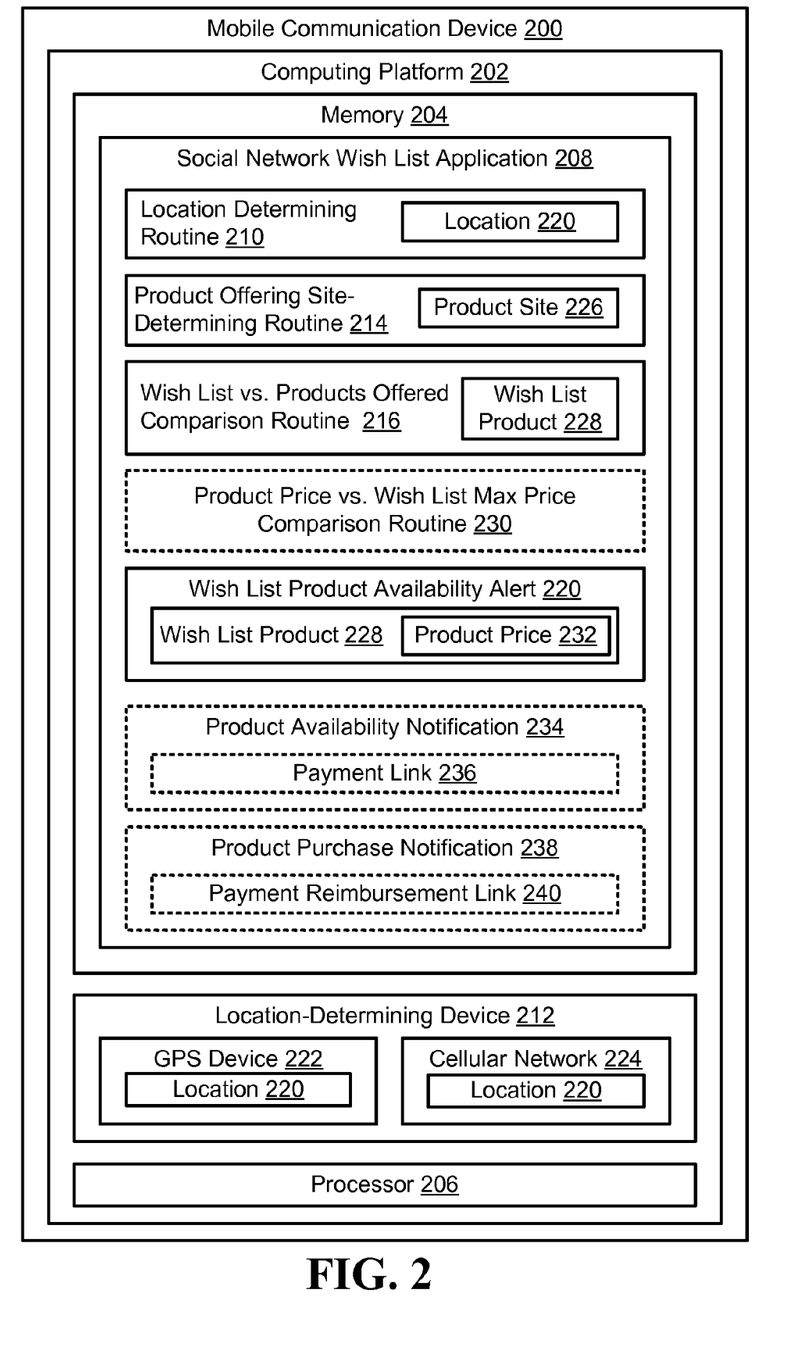
FIG. 2 is a block diagram illustrating a mobile communication device used to notify members of a social network that they are currently located at a location that has available products currently listed on social network-based wish list, in accordance with an embodiment of the invention.

Referring to FIG. 2, shown is a more detailed block diagram of the mobile communication device 100, according to embodiments of the present invention. The mobile communication device 100 is configured to delivery notifications to social network members when the social network member, in possession of the mobile communication device, is located at a location having products available currently listed on a social network-based wish list. In addition to providing greater detail, FIG. 2 highlights various alternate embodiments of the invention.

The mobile communication device 200 includes computing platform 202 that can receive and execute algorithms, such as routines, and applications. Computing platform 202 includes memory 204, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, computing platform 202 also includes processor 206, which may be an application-specific integrated circuit ("ASIC"), or other chipset, processor, logic circuit, or other data processing device. Processor 206 or other processor such as ASIC may execute an application programming interface ("API") (not shown in FIG. 2) that interfaces with any resident programs, such as social network wish list application 208 and routines associated therewith or the like stored in the memory 204 of the mobile communication device 200.

Processor 206 includes various processing subsystems embodied in hardware, firmware, software, and combinations thereof, that enable the functionality of mobile communication device 200 and the operability of the device on the network 300. For example, processing subsystems allow for initiating and maintaining communications and exchanging data with other networked devices. For the disclosed aspects, processing subsystems of processor 2046 may include any subsystem used in conjunction with social network wish list application 208 and related routines, sub-routines, sub-applications thereof.

Computer platform 202 may additionally include communications module (not shown in FIG. 2) embodied in hardware, firmware, software, and combinations thereof, that enables communications among the various components of the mobile communications device 200, as well as between the other networked devices. Thus, communication module may include the requisite hardware, firmware, software and/or combinations thereof for establishing a network communication connection and communicating alerts 218 to the mobile communication device 200.

As previously noted, the memory 204 of mobile communication device 200 stores social network wish list application 208 which is configured to automatically notify the members of a social network in possession of the mobile communication device 200 that they are currently located at a location that has available products currently listed on social network-based wish list.

Thus, social network wish list application 208 includes, or is in communication with, location-determining routine 210 that is configured to determine the current location 220 of the mobile communication device 200. The location-determining routine 110 is in communication with location-determining device/mechanism 212, such as a Global Positioning System (GPS) device 222, cellular network device 224 or the like which is operable to provide the location-determining routine 110 with the current location 220 of the mobile communication device.

The social network wish list application 208 additionally includes, or is in communication with) product offering site-determining routine 214 that is configured to determine that the current location of the mobile communication 200 is a product site 226 (i.e., the current location is a retail store location or the like). Such a determination is made by comparing the current location of the mobile communication device 200 to a geographic mapping of retail locations or sites that offer products.

The social network wish list application 208 additionally includes wish list versus products offered comparison routine 216 that is configured to compare the products offered at the current location to products currently listed on the wish list 110 to determine if a current wish list product 228 is currently offered by the product site 226.

In specific embodiments of the invention, the social network wish application additionally includes product price versus wish list maximum price comparison routine 230 that is configured to determine if the wish list product is currently priced by the product site at or below the maximum price on the wish list. In comparing product price versus maximum purchase price the routine 230 may take into account sales taxes and the shipping charges associated with either the product site 226 shipping the product or the product-locating member shipping the product. Such a comparison is warranted if the product listed on the wish list includes a maximum price limitation. In such embodiments, the wish list product availability alert 220 is only generated and communicated to the member if the product is currently available and is priced at or below the maximum price for which the member requesting the product is willing to pay.

The social network wish list application 208 will generate and initiate communication of a wish list product availability alert 218 if the product site 226 current has the product 228 available, and in some embodiments, if the product price is at or below the maximum purchase price stated on the wish list. The alert 218 may include additional information, such as the current price 232 of the product, the maximum price desired by the member desiring the product, the quantity of the product available, the quantity of the product desired by the member requesting the product, personal information associated the member desiring the product, such as delivery and or payment information, and/or delivery options provided by the retail location. In addition, the alert may indicate whether the product can be purchased without first notifying the member desiring the product, or if the member desiring product needs to be notified and confirmation of purchase received from the member prior to purchasing the product on behalf of the member. Additionally, the alert may be configured to include a link for purchasing the product or a link for generating an automated communication, such as an email or text communication, to the member desiring the product indicating the availability or the purchase of the product.

Thus, the social network wish list application 208 may additionally generate and initiate communication of a product availability notification 234 that is communicated to the member desiring the product if the member has configured the module to send such notifications prior to the member that has located product purchasing the product. It should be noted that the module may provide for the member to configure the application such that all products that the member includes in the wish list require such notification or the module may provide for the member to configure the application such that product availability notifications 234 are generated for specific member designated products only. In certain embodiments of the invention, the product availability notification 234 may include a link 236 for the member desiring the product to pay for the product. The link may be associated with the retail stores Internet-based online website or another third-party payment site. Payment by the member desiring the product eliminates the need for the member locating the product to pay for the product and subsequently be reimbursed by the member desiring the product. In other embodiments, in which the member desiring the product receives the product availability notifications 234, the member desiring the product will respond with an notification to the member that has located the product that indicates either a desire for the product to be purchased by the member locating the product or a desire to forego purchasing the product at this time.

Further, the social network wish list application 208 may additionally generate and initiate communication of a product purchase notification 238 to the member desiring the product. The product purchase notification 238 may be automatically generated or generated at the request of the member that has located and purchased the product on behalf of the member desiring the product. The product purchase notification 238 notifies the member that desires the product that the product has been purchased and, in some embodiments, the purchase prices, the quantity purchased, and information regarding delivery of the product. In addition, the product purchase notification 238 may include a link 240 configured to allow the member desiring the product to reimburse the member that has located and purchased the product. The reimbursement amount may include the product cost and any applicable sales tax and/or shipping charges. In addition, the product purchase notification 238 may serve as or include a receipt for the product purchased.

Figure 3:
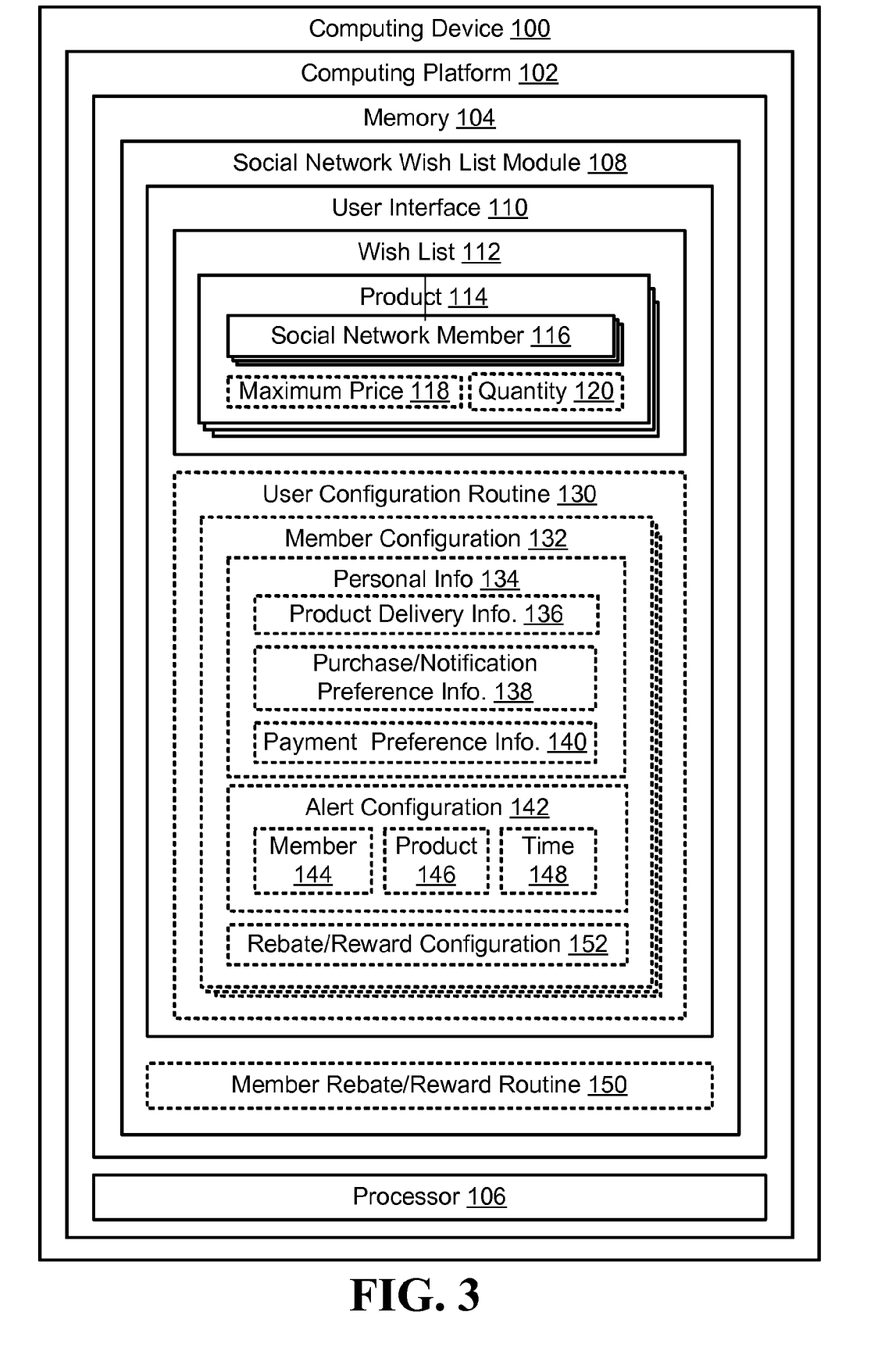
FIG. 3 is a block diagram of a computing device storing a social network-based wish list, in accordance with an embodiment of the invention.

Referring to FIG. 3, shown is a more detailed block diagram of the computing device 100, according to embodiments of the present invention. The computing device 100 is configured to store the social network wish list module 108, in accordance with embodiments of the present invention. In addition to providing greater detail, FIG. 3 highlights various alternate embodiments of the invention.

The computing device 100, which may comprise more than one unit or devices, includes computing platform 102 that can receive and execute algorithms, such as routines, and applications. Computing platform 102 includes memory 104, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") (not shown in FIG. 3) that interfaces with any resident programs, such as social network wish list module 108 and routines associated therewith or the like stored in the memory 104 of the computing device 100.

Processor 106 includes various processing subsystems embodied in hardware, firmware, software, and combinations thereof, that enable the functionality of computing device 100 and the operability of the device on the network 300. For example, processing subsystems allow for initiating and maintaining communications and exchanging data with other networked devices. For the disclosed aspects, processing subsystems of processor 104 may include any subsystem used in conjunction with service social network wish list module 108 and related routines, sub-routines, sub-modules thereof.

Computer platform 102 may additionally include communications module (not shown in FIG. 3) embodied in hardware, firmware, software, and combinations thereof, that enables communications among the various components of the mobile communications device 100, as well as between the other networked devices. Thus, communication module may include the requisite hardware, firmware, software and/or combinations thereof for establishing a network communication connection, and communicating information pertaining to the wish list.

As previously noted, the memory 104 of computing device 100 stores social network wish list module 108 that is configured to allow members of the social network the ability, through access of user interface 110 (e.g., graphical user interface application or the like), to generate and modify a wish list 112 that includes products 114 that the members desire to purchase. The wish list 112 includes products 114 that are desired by one or more social network members 116. Inclusion of a product 114 on the wish list 110 by a social network member indicates that the member desiring the product either desires another member to purchase the product when they encounter the product at a retail location or the like (without notifying the member desiring the product prior to purchasing the product), or desires to be notified by another member who is currently at a location that has the product available (thus, making it possible for the member to decide if they desire for the other member to purchase the product on their behalf).

In optional embodiments of the invention the entries on the wish list 112 may also include a corresponding maximum purchase price 118 and/or quantity 120. The maximum purchase price 118 is the highest price that the member desiring the product is willing to pay for the product (i.e., the highest price that the member is willing to reimburse another member of the social network who purchases the product on their behalf). In certain instances, the maximum product price may include any taxes and/or shipping charges associated with shipping the product incurred by the retailer or the member purchasing the product on behalf the member desiring the product. While in other instances, the module may allow the member to configure the maximum price 118 such that the price reflects the product alone (i.e., not including shipping charges and/or taxes). In such instances, the member desiring the product will additionally be responsible for paying or reimbursing the member purchasing the product on their behalf for the shipping charges and/or taxes. The quantity 120 indicates the maximum number of this specific product that the member desires. In the event that another member locates and purchases less than the quantity 120 indicated, the wish list may be automatically or manually updated to reflect an updated quantity 120 desired by the member.

In other specific embodiments the social network wish list module 108 includes user configuration routine 130 that is accessible by members of the social network via user interface 110. The user configuration routine 130 allows the members of the social network to configure parameters related to other members purchasing products that the user/member lists on the wish list, as well as the user/member purchasing products on the wish list on behalf of other members. Thus, the user configuration routine 130 may allow for the user/member to input and/or revise personal information, including a product delivery address(es) 136, purchase/notification preference information 138 and payment preference information 140. Purchase/notification preference information 138 provides for the member to indicate whether they desire to be notified that another member has located the product they desire or whether they desire the member locating their desired product to purchase the product without notifying first. Such purchase/notification preference may be configured by the member to apply to all products wish the member lists on the wish lists or the member may designate products on a product-by-product basis. Payment preference information 140 provides for the member to indicate the payment account/product they wish to use when paying for product located by another member. In such instance, the notification sent to the member indicating that the product has been located may include a link associated with the member's selected payment account/product. Additionally payment preference information 140 provides for the member to indicate the reimbursement account/product that they desire to have members use for reimbursing when they purchase products they have located that currently are listed on the wish list. In such instances, the purchase notification sent to the member desiring the product may include a link associated with the member's selected reimbursement account/product.

Additionally user configuration routine 130 may provide for the member to configure alert notifications, such that alert notifications are only sent to the member if the defined alert filters/criteria are met. Alert configuration 142 may include a member filter 144 such that the member will only receive alerts if the product that they have encountered is desired by a member they have selected (e.g., only local members who reside near the member, only friends and/or family members or the like). Alert configuration 142 may also include product type filter 146 such that the member will only receive alerts if the product that they have encountered is of the product type selected by the member (e.g., electronics only). In still further embodiments alert configuration 142 may include time filters 148 such that the member can limit when they receive alerts based on dates and time of day.

The social network wish list module 108 may additionally include a member rebate/rewards routine 150 configured to provide a rebates or a reward to a member that purchases a product on the list on behalf of another member desiring the product. In certain embodiments of the invention rebates or rewards may be beneficial in encouraging members to participate in the social network wish list program. In certain instances the amount of the reward may be the difference between the maximum price that a member is willing to pay for a product and the current price being offered at the location. Thus, for example, if the maximum price that a member is willing to pay is $100 and a member locates and purchase the product for $75, the reward may be $25, i.e., the difference between $100 and $75. In such instances the customer desiring the product may not be aware or provided feedback on what the actual purchase price was for the product. In other embodiments of the invention the member purchasing the product they have located may receive a percentage of the difference between the maximum price and the actual purchase price, with the remaining percentage being passed along to the member desiring the product. In other embodiments of the invention, purchasing products from the wish list on behalf of the other members may result in rewards points or the like that can subsequently be redeemed for products, services or the like. In such embodiments in which the social network wish list module 108 implements a member reward/rebate routine 150, the user configuration routine 130 may additionally include rebate/reward configuration 152 that provides for members to select any rewards/rebates options offered by the social network wish list program and to designate which wish list purchases that the member makes should be afforded rebates rewards (e.g., if the wish list purchase is for a friend or family member the purchasing member may desire to forego any or a substantial portion of any reward, such that the savings realized is passed entire along to the friend or family member desiring the product).

Figure 4:
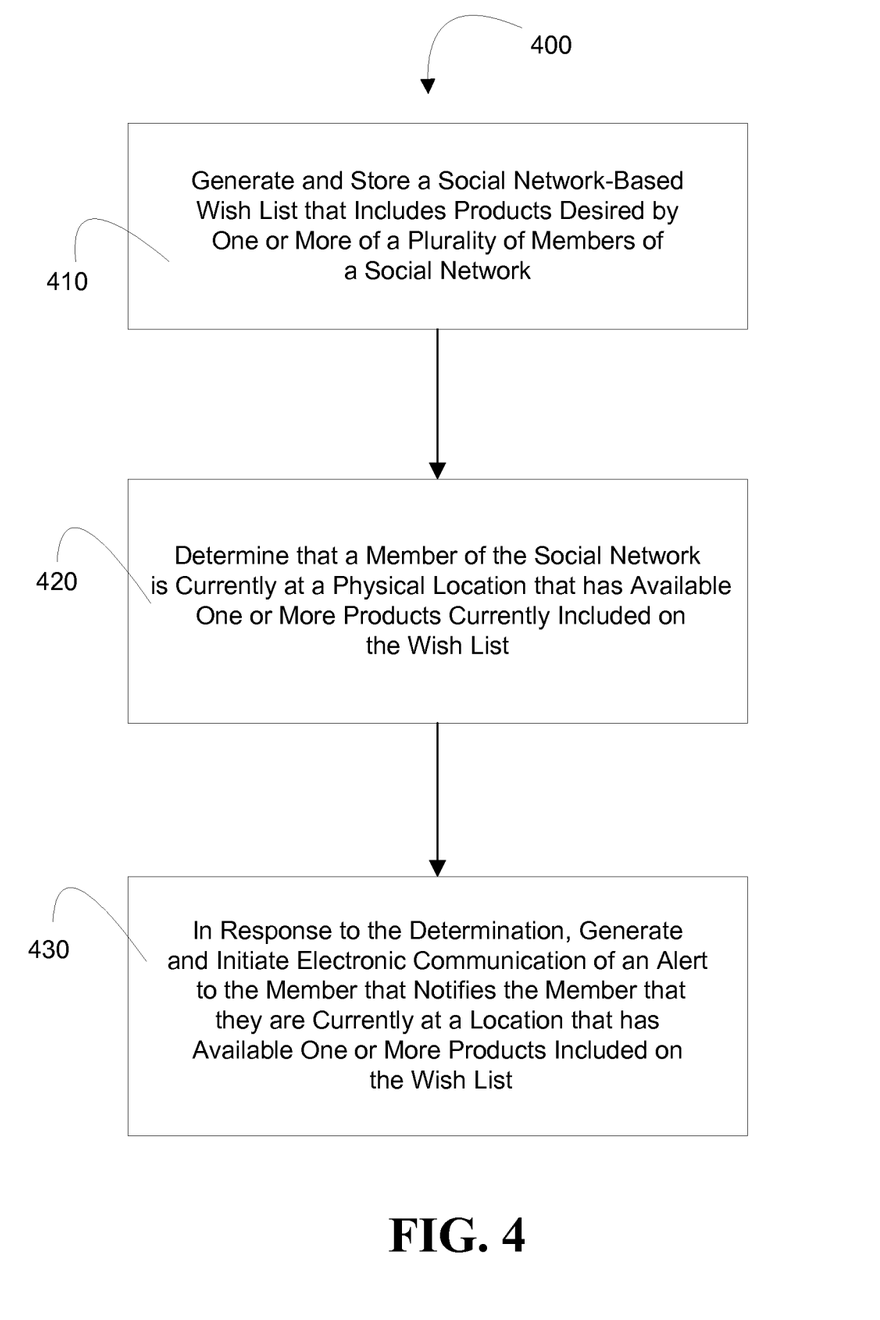
FIG. 4 is a flow diagram illustrating a method for notifying members of a social network that they are currently located at a location that has available products currently listed on social network-based wish list, in accordance with embodiment of the present invention.

FIG. 4 is a flow diagram of a method for notifying members of a social network that they are currently located at a location that has available products currently listed on social network-based wish list, in accordance with embodiments of the present invention. At Event 410 a social-network-based wish list is generated and stored in computing memory. The wish list includes products desired by members of the social network that the members either desired to be notified when another member is located at a location that currently has the product available for purchase or has authorized any other social network member to purchase the product on their behalf when the other member locates the product. Additionally, in specific embodiments of the method, the member desiring the product may include a maximum purchase price for the product and a quantity desired. Such indication on the wish list further defines criteria for either purchasing the product or notifying the member of the product's availability at a current location of another member. For example, the member will only be notified and/or the product purchased on their behalf if the product price is at or below the maximum purchase price.

Further, as previously described the social network may be an exclusive social-network that includes only members authorized to participate based on their inclusion in a group, class or the like. For example, the social network may be limited by family members, employees of a specific business or the like. While in other embodiments of the invention the social network may be an all-inclusive social network that allows for anyone to join and participate.

It should be noted that once generated the wish list remains dynamic, in that, a member can add products to the wish list, modify a product listing on the wish limit or delete a product from the wish list at any point in time. Modifying or deleting a product from the wish list may not occur instantaneously so as to account for the fact that a product may have been located and is being purchased at the same time that a member is modifying or deleting the product from the wish list.

At Event 420, a determination is made that a member of the social network is currently at a physical location that currently has available one or more of the products included on the wish list. In specific embodiments such determination is made by the mobile communication device in possession of the member. The mobile communication device (1) identifies the geographic location of the device, (2) determines that the location maps to product offering site (i.e., a retail store or the like), and (3) determines that one or more of the products currently on the wish list match a product currently being offered by the product offering site. In specific embodiments of the invention, based on the wish list further indicating a maximum price and/or quantity, the determination of the match between wish list products and products offered at the site may further include determining that purchase price of the product offered at the site is at or below the maximum purchase price and determining if a currently available quantity of the product can fulfill the quantity desired on the wish list listing.

At Event 430, in response determining that the product is currently available at the location at which the member is located, an alert is generated an electronic communication of the alert is initiated to the member, such as via the mobile communication device that notifies the member that they are currently at a location that has available one or more of the products included on the wish list. In specific embodiments of the method the alert is only generated and communicated if the available product meets other wish list-defined criteria, such as the purchase price being at or below the designated maximum purchase price. In addition to indicating what the product is, the alert may also indicate the member(s) desiring the product, the purchase price, whether the member should purchase the product without notifying the member(s) first or whether notification (and subsequent purchase authorization) is required prior to purchasing the product on behalf of the member desiring the product.

According to optional embodiments of the method, once the member receives the alert and based on configuration of the wish list by the member desiring the product, the member receiving the alert may purchase the product for the member desiring the product and, in response to purchasing the product, generate and initiate communication of a notification to the member desiring the product that indicates that the product has been purchased on their behalf. In addition the notification may include a reimbursement link that upon activation by the recipient allows the member to reimburse the member that purchased the product on their behalf. In other embodiment of the method, once the member receives the alert and based on configuration of the wish list by the member desiring the product, the member receiving the alert or the application may be configured to automatically generate and initiate communication of a notification to the member desiring the product that indicates that another member of the social network has located the product. In addition the notification may include a payment link that upon activation by the member desiring the product allows the member to pay for the product, thus eliminating the need of the member locating the product paying for the product and requiring subsequent reimbursement.

It should be noted that once the product is purchased the product may either manually (by either the locating member purchasing the product or the member desiring the product) or automatically removed from the wish list, in response to payment or reimbursement through the link included in one of the product available notification or the product purchased notification.

Further, in those embodiments in which the social network wish list program institutes a rewards/rebate program, upon completion of the purchase of the product the system may automatically credit the member's account with the requisite reward and/or rebate associate with the purchase of the product.

Thus, methods, systems, computer programs and the like have been disclosed that provide for generating a social network-based wish list of products desired by members of the social network and which are authorized to be purchased by other members of the social network on behalf of the member requesting the product. Once generated, the wish list is stored in computing device memory that is accessible and updateable to all members of the social network. Further, the present invention provides for automatically notifying a member of the social network that they are currently located at physical location, such as a retail store or the like, that currently has available one or more of the products on the wish list. The notifications may take the form of alerts communicated on the member's mobile communication device, such as a cellular smartphone or the like. Automatic notification occurs via a mobile communication device that is capable of identifying current location, determining that the current location has products available (i.e., is a retail location), and determine that one or more of the products currently available at the location are currently listed on the wish list. Once the member has been notified of the product availability, the member of the social network may choose to purchase the product on behalf of the member requesting the product or notify the member requesting the product of its availability.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for notifying members of a social network of the availability of products currently included on a social network-based wish list, the apparatus comprising:
   a server device including a first computing platform comprising a first processor and a first memory in communication with the first processor;
   a social network wish list module stored in the first memory, executable by the first processor, configured to store the social network-based wish list that includes products desired by one or more of a plurality of members of a social network;
   a mobile communication device including a second computing platform comprising a second processor and a second memory in communication with the second processor; and
   a social network wish list application stored in the second memory, executable by the second processor and configured to (1) determine that a first member of the social network is currently at a physical location that offers one or more of the products, (2) determine that the physical location offers one or more products currently included on the social network-based wish list by comparing products currently listed on the social network-based wish list to products currently available at the physical location and, based on the comparing, identify a product match exists between a product currently listed on the social network-based wish list and a product currently available at the physical location, and (3) in response to the determinations, generate and initiate communication of an alert, to the first member of the social network, that notifies the first member that they are currently at a location that offers one or more of the products currently included on the social network-based wish list.

2. The apparatus of claim 1, wherein the social network wish list module is further configured to store the social network-based wish list that includes the products desired by the one or more of the plurality of members of a social network and a maximum purchase price that each of the one or more members is willing to pay for the corresponding product.

3. The apparatus of claim 2, wherein the social network wish list application is further configured to determine that the product currently listed on the social network-based wish list is currently available at the physical location at a price at or below the maximum purchase price that a member is willing to pay for the product.

4. The apparatus of claim 1, wherein the social network wish list application is further configured to generate and initiate electronic communication of a product availability notification to a second member of the social network that desired the product that indicates that product has been located.

5. The apparatus of claim 4, wherein the social network wish list application is further configured to generate and initiate electronic communication of the product availability notification including a payment link configured to allow the second member to purchase the product.

6. The apparatus of claim 1, wherein the social network wish list application is further configured to generate and initiate electronic communication of a product purchase notification to a second member of the social network that indicates that the product has been purchased and requesting re-imbursement through one of Person-to-Person (P2P) payment or online payment.

7. The apparatus of claim 1, wherein the social network wish list module further comprises a member reward routine configured to provide the first member of the social network a financial reward in response to the first member purchasing the product for a second member of the social network.

8. The apparatus of claim 7, wherein the member reward routine is further configured to provide the first member of the social network the financial reward, wherein the financial rewards is a difference in amount between the purchase price of the product and a maximum purchase price that a second member of the social network is willing to pay for the product.

9. A method for notifying members of a social network of the availability of products currently included on a social network-based wish list, the method comprising:
   generating and storing, in computing device memory, the social network-based wish list that includes products desired by one or more of a plurality of members of a social network;
   determining, by a computing device processor, that a first member of the social network is currently at a physical location that offers one or more of the products;
   determining, by a computing device processor, that the physical location offers one or more products currently included on the social network-based wish list by comparing products currently listed on the social network-based wish list to products currently available at the physical location and, based on the comparing, identify a product match exists between a product currently listed on the social network-based wish list and a product currently available at the physical location; and
   in response to the determinations, generating, by a computing device processor, and initiating electronic communication, to the first member of the social network, an alert that notifies the first member that they are currently at a location that offers one or more of the products currently included on the social network-based wish list.

10. The method of claim 9, wherein generating and storing further comprises generating and storing, in computing device memory, the social network-based wish list that includes the products desired by the one or more of the plurality of members of a social network and a maximum purchase price that each of the one or more members is willing to pay for the corresponding product.

11. The method of claim 10, wherein determining further comprises:
   determining, by the computing device processor, that the product currently listed on the wish list is currently available at the physical location at a price at or below the maximum purchase price that a member is willing to pay for the product.

12. The method of claim 9, further comprising generating, by a computing device processor, and initiating electronic communication of a notification to a second member of the social network that desired the product that indicates that product has been located.

13. The method of claim 12, wherein generating and initiating electronic communication of the notification further comprises generating and initiating electronic communication of the notification including a payment link configured to allow the member that desires the product to purchase the product.

14. The method of claim 9, further comprising generating, by a computing device processor, and initiating electronic communication of a notification to a second member of the social network that indicates that the product has been purchased and requesting re-imbursement through one of Person-to-Person (P2P) payment or online payment.

15. The method of claim 9, further comprising providing the first member of the social network a financial reward in response to the first member purchasing the product for a second member of the social network.

16. The method of claim 15, wherein providing further comprises providing the first member of the social network the financial reward, wherein the financial rewards is a difference in amount between the purchase price of the product and a maximum purchase price that a second member of the social network is willing to pay for the product.

17. A computer program product, the computer program product comprising a non-transitory computer-readable medium having computer-executable instructions to cause a computer to implement the steps of:
   generating and storing the social network-based wish list that includes products desired by one or more of a plurality of members of a social network;
   determining that a first member of the social network is currently at a physical location that offers one or more of the products currently included on the social network-based wish list;
   determining that the physical location offers one or more products currently included on the social network-based wish list by comparing products currently listed on the social network-based wish list to products currently available at the physical location and, based on the comparing, identify a product match exists between a product currently listed on the social network-based wish list and a product currently available at the physical location; and
   in response to the determinations, generating and initiating electronic communication, to the first member of the social network, an alert that notifies the first member that they are currently at a location that offers one or more of the products currently included on the social network-based wish list.

18. The computer program product of claim 17, wherein the step of generating and storing further comprises generating and storing the social network-based wish list that includes the products desired by the one or more of the plurality of members of a social network and a maximum purchase price that each of the one or more members is willing to pay for the corresponding product.

19. The computer program product of claim 18, wherein the step of determining further comprises:
   determining that the product currently listed on the wish list is currently available at the physical location at a price at or below the maximum purchase price that a member is willing to pay for the product.

20. The computer program product of claim 17, wherein the steps further comprise generating and initiating electronic communication of a notification to a second member of the social network that desired the product that indicates that product has been located.

21. The computer program product of claim 20, wherein the step of generating and initiating electronic communication of the notification further comprises generating and initiating electronic communication of the notification including a payment link configured to allow the member that desires the product to purchase the product.

22. The computer program product of claim 17, wherein the steps further comprise generating and initiating electronic communication of a notification to a second member of the social network that indicates that the product has been purchased and requesting re-imbursement through one of Person-to-Person (P2P) payment or online payment.

23. The computer program product of claim 17, wherein the steps further comprise providing the first member of the social network a financial reward in response to the first member purchasing the product for a second member of the social network.

24. The computer program product of claim 23, wherein the step of providing further comprises providing the first member of the social network the financial reward, wherein the financial rewards is a difference in amount between the purchase price of the product and a maximum purchase price that a second member of the social network is willing to pay for the product.

* * * * *